(12) United States Patent
Aibester et al.

(10) Patent No.: US 12,375,404 B2
(45) Date of Patent: Jul. 29, 2025

(54) FLOW-BASED CONGESTION CONTROL

(71) Applicant: MELLANOX TECHNOLOGIES, LTD., Yokneam (IL)

(72) Inventors: Niv Aibester, Herzliya (IL); Gil Levy, Hod Hasharon (IL); Yuval Shpigelman, Netanya (IL)

(73) Assignee: Mellanox Technologies, Ltd, Yokneam (IL)

(*) Notice: Subject to any disclaimer, the term of this patent is extended or adjusted under 35 U.S.C. 154(b) by 370 days.

(21) Appl. No.: 17/895,108

(22) Filed: Aug. 25, 2022

(65) Prior Publication Data
US 2024/0073141 A1    Feb. 29, 2024

(51) Int. Cl.
*H04L 47/12* (2022.01)
*H04L 47/30* (2022.01)
*H04L 47/62* (2022.01)
*H04L 47/6295* (2022.01)

(52) U.S. Cl.
CPC .............. *H04L 47/12* (2013.01); *H04L 47/30* (2013.01); *H04L 47/621* (2013.01); *H04L 47/6295* (2013.01)

(58) Field of Classification Search
CPC ........ H04L 47/12; H04L 47/30; H04L 47/621
See application file for complete search history.

(56) References Cited

U.S. PATENT DOCUMENTS

| | | | |
|---|---|---|---|
| 5,014,265 A | 5/1991 | Hahne et al. | |
| 5,235,642 A | 8/1993 | Wobber et al. | |
| 5,367,520 A | 11/1994 | Cordell | |
| 5,541,912 A | 7/1996 | Choudhury et al. | |
| 5,574,885 A | 11/1996 | Denzel et al. | |
| 5,790,522 A | 8/1998 | Fichou et al. | |
| 5,917,947 A | 6/1999 | Ishida et al. | |

(Continued)

FOREIGN PATENT DOCUMENTS

| CN | 1379569 A | 11/2002 |
|---|---|---|
| EP | 0706298 A2 | 4/1996 |

(Continued)

OTHER PUBLICATIONS

U.S. Appl. No. 17/902,936 Office Action dated May 16, 2024.

(Continued)

*Primary Examiner* — Emmanuel L Moise
*Assistant Examiner* — Mariegeorges A Henry
(74) *Attorney, Agent, or Firm* — Meitar Patents Ltd.; Daniel Kligler

(57) ABSTRACT

A network device includes multiple ports, a Shared Buffer (SB) and a SB controller. The ports to connect to a communication network. The SB to temporarily store packets received from the communication network via the ports, the packets belonging to multiple flows. The SB controller to allocate one or more flow-specific storage regions in the SB, a given flow-specific storage region being allocated to store the packets that (i) belong to respective one or more of the flows and (ii) are to be transmitted via a respective egress queue. In response to detecting that an occupancy level in the given flow-specific storage region exceeds a specified occupancy threshold, the SB controller to report the flows in the given flow-specific storage region as congested.

16 Claims, 4 Drawing Sheets

(56) References Cited

U.S. PATENT DOCUMENTS

| | | | |
|---|---|---|---|
| 6,108,713 A | 8/2000 | Sambamurthy et al. |
| 6,154,446 A | 11/2000 | Kadambi et al. |
| 6,160,814 A | 12/2000 | Ren et al. |
| 6,169,748 B1 | 1/2001 | Barbas et al. |
| 6,178,448 B1 | 1/2001 | Gray et al. |
| 6,219,728 B1 | 4/2001 | Yin |
| 6,324,165 B1 | 11/2001 | Fan et al. |
| 6,347,337 B1 | 2/2002 | Shah et al. |
| 6,456,590 B1 | 9/2002 | Ren et al. |
| 6,490,248 B1 | 12/2002 | Shimojo |
| 6,535,963 B1 | 3/2003 | Rivers |
| 6,539,024 B1 | 3/2003 | Janoska et al. |
| 6,594,263 B1 | 7/2003 | Martinsson et al. |
| 6,606,666 B1 | 8/2003 | Bell et al. |
| 6,633,395 B1 | 10/2003 | Tuchitoi et al. |
| 6,657,955 B1 * | 12/2003 | Bonneau ............ H04Q 11/0478 710/52 |
| 6,678,277 B1 | 1/2004 | Wils et al. |
| 6,687,254 B1 | 2/2004 | Ho et al. |
| 6,771,654 B1 | 8/2004 | Sang et al. |
| 6,859,435 B1 | 2/2005 | Lee et al. |
| 6,895,015 B1 | 5/2005 | Chiang et al. |
| 6,922,408 B2 | 7/2005 | Bloch et al. |
| 6,973,555 B2 | 12/2005 | Fujiwara et al. |
| 6,993,032 B1 | 1/2006 | Dammann et al. |
| 7,027,457 B1 | 4/2006 | Chiussi et al. |
| 7,068,822 B2 | 6/2006 | Scott |
| 7,088,713 B2 | 8/2006 | Battle et al. |
| 7,131,125 B2 | 10/2006 | Modelski et al. |
| 7,136,381 B2 | 11/2006 | Battle et al. |
| 7,190,667 B2 | 3/2007 | Susnow et al. |
| 7,215,641 B1 | 5/2007 | Bechtolsheim et al. |
| 7,321,553 B2 | 1/2008 | Prasad et al. |
| 7,324,442 B1 | 1/2008 | Pan et al. |
| 7,327,749 B1 | 2/2008 | Mott |
| 7,330,426 B2 | 2/2008 | Berzosa et al. |
| 7,334,065 B1 | 2/2008 | Rose et al. |
| 7,346,059 B1 | 3/2008 | Gamer et al. |
| 7,391,787 B1 * | 6/2008 | McCrosky ............ H04L 49/506 370/428 |
| 7,529,245 B1 | 5/2009 | Muller et al. |
| 7,590,058 B1 | 9/2009 | Cherchali et al. |
| 7,609,636 B1 | 10/2009 | Mott |
| 7,630,306 B2 | 12/2009 | Chuang |
| 7,680,139 B1 | 3/2010 | Jones et al. |
| 7,738,454 B1 | 6/2010 | Panwar et al. |
| 7,747,086 B1 | 6/2010 | Hobbs et al. |
| 7,773,621 B2 | 8/2010 | Jensen |
| 7,773,622 B2 | 8/2010 | Schmidt et al. |
| 7,778,168 B1 | 8/2010 | Rodgers et al. |
| 7,813,348 B1 | 10/2010 | Gupta et al. |
| 7,821,939 B2 | 10/2010 | Decusatis et al. |
| 7,835,380 B1 | 11/2010 | Aloni et al. |
| 7,853,738 B2 | 12/2010 | Pothireddy et al. |
| 7,856,026 B1 | 12/2010 | Finan et al. |
| 7,872,973 B2 | 1/2011 | Sterne et al. |
| 7,894,343 B2 | 2/2011 | Chao et al. |
| 7,924,708 B2 | 4/2011 | Spink |
| 7,936,770 B1 | 5/2011 | Frattura et al. |
| 8,060,644 B1 | 11/2011 | Michailidis et al. |
| 8,078,743 B2 | 12/2011 | Sharp et al. |
| 8,125,902 B2 | 2/2012 | Rochon et al. |
| 8,149,710 B2 | 4/2012 | Bergamasco et al. |
| 8,270,295 B2 | 9/2012 | Kendall et al. |
| 8,274,971 B2 | 9/2012 | Battle et al. |
| 8,345,548 B2 | 1/2013 | Gusat et al. |
| 8,352,648 B1 | 1/2013 | Puranik |
| 8,473,693 B1 | 6/2013 | Muppalaneni et al. |
| 8,478,811 B2 | 7/2013 | Garg et al. |
| 8,565,092 B2 | 10/2013 | Arumilli et al. |
| 8,576,715 B2 | 11/2013 | Bloch et al. |
| 8,589,587 B1 | 11/2013 | Michailidis et al. |
| 8,599,868 B2 | 12/2013 | Sindhu et al. |
| 8,630,294 B1 | 1/2014 | Keen et al. |
| 8,635,386 B2 | 1/2014 | Takahashi |
| 8,656,188 B2 | 2/2014 | Goodwill et al. |
| 8,699,491 B2 | 4/2014 | Koren et al. |
| 8,705,349 B2 | 4/2014 | Bloch et al. |
| 8,730,982 B2 | 5/2014 | Wu et al. |
| 8,738,860 B1 | 5/2014 | Griffin et al. |
| 8,762,595 B1 | 6/2014 | Muller et al. |
| 8,767,561 B2 | 7/2014 | Gnanasekaran et al. |
| 8,811,183 B1 | 8/2014 | Anand et al. |
| 8,838,882 B1 | 9/2014 | Quong |
| 8,879,396 B2 | 11/2014 | Wiklund |
| 8,923,337 B2 | 12/2014 | Singh |
| 8,989,017 B2 | 3/2015 | Naouri et al. |
| 8,995,265 B2 | 3/2015 | Basso et al. |
| 9,013,999 B1 | 4/2015 | Kondapalli |
| 9,014,006 B2 | 4/2015 | Haramaty et al. |
| 9,130,885 B1 | 9/2015 | Bukspan et al. |
| 9,210,095 B2 | 12/2015 | Basso et al. |
| 9,325,619 B2 | 4/2016 | Guay et al. |
| 9,325,641 B2 | 4/2016 | Haramaty et al. |
| 9,356,868 B2 | 5/2016 | Tabatabaee et al. |
| 9,426,085 B1 | 8/2016 | Anand et al. |
| 9,497,125 B2 | 11/2016 | Raindel et al. |
| 9,563,361 B1 | 2/2017 | Asiot et al. |
| 9,584,429 B2 | 2/2017 | Haramaty et al. |
| 9,648,148 B2 | 5/2017 | Rimmer et al. |
| 9,699,095 B2 | 7/2017 | Elias et al. |
| 9,742,683 B1 | 8/2017 | Vanini |
| 9,742,702 B1 | 8/2017 | Bukspan et al. |
| 9,762,491 B2 | 9/2017 | Gafni et al. |
| 9,807,024 B2 | 10/2017 | Shpiner et al. |
| 10,050,896 B2 | 8/2018 | Yang et al. |
| 10,069,701 B2 | 9/2018 | Elias et al. |
| 10,069,748 B2 | 9/2018 | Shpiner et al. |
| 10,084,716 B2 | 9/2018 | Gafni |
| 10,205,683 B2 | 2/2019 | Elias et al. |
| 10,237,376 B2 | 3/2019 | Crupnicoff et al. |
| 10,250,530 B2 | 4/2019 | Aibester et al. |
| 10,387,074 B2 | 8/2019 | Kriss et al. |
| 10,530,846 B2 | 1/2020 | Jung |
| 10,728,156 B2 | 7/2020 | Kwan et al. |
| 10,778,568 B2 | 9/2020 | Levy et al. |
| 10,951,549 B2 | 3/2021 | Elias et al. |
| 10,999,221 B2 | 5/2021 | Gafni et al. |
| 11,099,891 B2 | 8/2021 | Baldocchi et al. |
| 11,218,413 B2 | 1/2022 | Shpigelman et al. |
| 11,296,988 B2 | 4/2022 | Shpigelman et al. |
| 11,470,010 B2 | 10/2022 | Mula et al. |
| 11,563,695 B2 | 1/2023 | Mitulal et al. |
| 2002/0012340 A1 | 1/2002 | Kalkunte et al. |
| 2002/0019916 A1 | 2/2002 | Henrion |
| 2002/0027908 A1 | 3/2002 | Kalkunte et al. |
| 2002/0039350 A1 | 4/2002 | Wang et al. |
| 2002/0055993 A1 | 5/2002 | Shah et al. |
| 2002/0067695 A1 | 6/2002 | Skarpness et al. |
| 2002/0087723 A1 | 7/2002 | Williams et al. |
| 2002/0176430 A1 | 11/2002 | Sangha et al. |
| 2002/0176432 A1 | 11/2002 | Courtney et al. |
| 2002/0191559 A1 | 12/2002 | Chen et al. |
| 2003/0016628 A1 | 1/2003 | Kadambi et al. |
| 2003/0016697 A1 | 1/2003 | Jordan |
| 2003/0043828 A1 | 3/2003 | Wang et al. |
| 2003/0048792 A1 | 3/2003 | Xu et al. |
| 2003/0065812 A1 | 4/2003 | Beier et al. |
| 2003/0076849 A1 | 4/2003 | Morgan et al. |
| 2003/0095560 A1 | 5/2003 | Arita et al. |
| 2003/0108010 A1 | 6/2003 | Kim et al. |
| 2003/0112817 A1 | 6/2003 | Woo et al. |
| 2003/0117958 A1 | 6/2003 | Nation et al. |
| 2003/0118016 A1 | 6/2003 | Kalkunte et al. |
| 2003/0120894 A1 | 6/2003 | Wang et al. |
| 2003/0123392 A1 | 7/2003 | Ruutu et al. |
| 2003/0137939 A1 | 7/2003 | Dunning et al. |
| 2003/0179765 A1 | 9/2003 | Goetzinger et al. |
| 2003/0198231 A1 | 10/2003 | Kalkunte et al. |
| 2003/0198241 A1 | 10/2003 | Putcha et al. |
| 2003/0200330 A1 | 10/2003 | Oelke et al. |
| 2003/0217184 A1 | 11/2003 | Nair |
| 2003/0222860 A1 | 12/2003 | Yamaura |
| 2003/0223368 A1 | 12/2003 | Allen et al. |

(56) References Cited

U.S. PATENT DOCUMENTS

| | | |
|---|---|---|
| 2003/0223435 A1 | 12/2003 | Gil |
| 2004/0008714 A1 | 1/2004 | Jones |
| 2004/0027989 A1 | 2/2004 | Martin et al. |
| 2004/0037558 A1 | 2/2004 | Beshasi |
| 2004/0066785 A1 | 4/2004 | He et al. |
| 2004/0081090 A1 | 4/2004 | Hara et al. |
| 2004/0202169 A1 | 10/2004 | Mukouyama et al. |
| 2005/0053077 A1 | 3/2005 | Blanc et al. |
| 2005/0063370 A1 | 3/2005 | Beshai et al. |
| 2005/0076138 A1 | 4/2005 | Sterne |
| 2005/0094643 A1 | 5/2005 | Wang et al. |
| 2005/0125424 A1 | 6/2005 | Herriott et al. |
| 2005/0129033 A1 | 6/2005 | Gordy et al. |
| 2005/0135356 A1 | 6/2005 | Muthukrishnan et al. |
| 2005/0169172 A1 | 8/2005 | Wang et al. |
| 2005/0204103 A1 | 9/2005 | Dennison |
| 2005/0216822 A1 | 9/2005 | Kyusojin et al. |
| 2005/0223139 A1 | 10/2005 | Wagh et al. |
| 2005/0226156 A1 | 10/2005 | Keating et al. |
| 2005/0228900 A1 | 10/2005 | Stuart et al. |
| 2005/0259574 A1 | 11/2005 | Figueira et al. |
| 2006/0008803 A1 | 1/2006 | Brunner et al. |
| 2006/0034172 A1 | 2/2006 | Morton |
| 2006/0087989 A1 | 4/2006 | Gai et al. |
| 2006/0088036 A1 | 4/2006 | De Prezzo |
| 2006/0092837 A1* | 5/2006 | Kwan ............... H04L 47/266 370/468 |
| 2006/0092842 A1 | 5/2006 | Beukema et al. |
| 2006/0092845 A1 | 5/2006 | Kwan et al. |
| 2006/0095609 A1 | 5/2006 | Radhakrishnan et al. |
| 2006/0155938 A1 | 7/2006 | Cummings et al. |
| 2006/0182112 A1 | 8/2006 | Battle et al. |
| 2006/0251109 A1 | 11/2006 | Muller et al. |
| 2007/0015525 A1 | 1/2007 | Beming et al. |
| 2007/0019553 A1 | 1/2007 | Sagfors et al. |
| 2007/0025242 A1 | 2/2007 | Tsang |
| 2007/0041385 A1 | 2/2007 | Sali et al. |
| 2007/0053350 A1 | 3/2007 | Spink et al. |
| 2007/0097257 A1 | 5/2007 | El-Maleh et al. |
| 2007/0104102 A1 | 5/2007 | Opsasnick |
| 2007/0104211 A1 | 5/2007 | Opsasnick |
| 2007/0147292 A1 | 6/2007 | Van Ewijk et al. |
| 2007/0201499 A1 | 8/2007 | Kapoor et al. |
| 2007/0274215 A1 | 11/2007 | Gusat et al. |
| 2007/0291644 A1 | 12/2007 | Roberts et al. |
| 2007/0297453 A1 | 12/2007 | Niinomi |
| 2008/0037420 A1 | 2/2008 | Tang et al. |
| 2008/0144670 A1 | 6/2008 | Gooossens et al. |
| 2008/0175146 A1 | 7/2008 | Van Leekwuck et al. |
| 2008/0192764 A1 | 8/2008 | Arefi et al. |
| 2008/0259936 A1 | 10/2008 | Hussain et al. |
| 2009/0003212 A1 | 1/2009 | Kwan et al. |
| 2009/0010162 A1 | 1/2009 | Bergamasco et al. |
| 2009/0073881 A1 | 3/2009 | Cui |
| 2009/0122702 A1 | 5/2009 | Chew et al. |
| 2009/0161684 A1 | 6/2009 | Voruganti et al. |
| 2009/0178140 A1* | 7/2009 | Cao ............... H04L 63/1416 726/23 |
| 2009/0182944 A1 | 7/2009 | Comparan et al. |
| 2009/0207848 A1 | 8/2009 | Kwan et al. |
| 2010/0057953 A1 | 3/2010 | Kim et al. |
| 2010/0061238 A1 | 3/2010 | Godbole et al. |
| 2010/0061390 A1 | 3/2010 | Godbole et al. |
| 2010/0067539 A1 | 3/2010 | Lin et al. |
| 2010/0088756 A1 | 4/2010 | Balakrishnan et al. |
| 2010/0100670 A1 | 4/2010 | Jeddeloh |
| 2010/0165842 A1 | 7/2010 | Wang et al. |
| 2010/0220742 A1 | 9/2010 | Brewer et al. |
| 2010/0322076 A1 | 12/2010 | Goel |
| 2010/0325318 A1 | 12/2010 | Desoli et al. |
| 2011/0058571 A1 | 3/2011 | Bloch et al. |
| 2011/0286468 A1 | 11/2011 | Tomonaga et al. |
| 2012/0072635 A1 | 3/2012 | Yoshida et al. |
| 2012/0106562 A1 | 5/2012 | Laor et al. |
| 2012/0106567 A1 | 5/2012 | Hanes et al. |
| 2012/0144064 A1 | 6/2012 | Parker et al. |
| 2012/0155264 A1 | 6/2012 | Sharma et al. |
| 2012/0163396 A1 | 6/2012 | Cheng et al. |
| 2013/0014118 A1 | 1/2013 | Jones |
| 2013/0021354 A1 | 1/2013 | Van Eerd et al. |
| 2013/0039178 A1 | 2/2013 | Chen et al. |
| 2013/0077489 A1 | 3/2013 | Bloch et al. |
| 2013/0212296 A1 | 8/2013 | Goel et al. |
| 2013/0239119 A1 | 9/2013 | Garg et al. |
| 2013/0250757 A1 | 9/2013 | Tabatabaee et al. |
| 2013/0250762 A1 | 9/2013 | Assarpour |
| 2013/0275631 A1 | 10/2013 | Magro et al. |
| 2013/0286834 A1 | 10/2013 | Lee |
| 2013/0305250 A1 | 11/2013 | Durant |
| 2014/0036680 A1 | 2/2014 | Lih et al. |
| 2014/0036930 A1 | 2/2014 | Lih et al. |
| 2014/0095745 A1 | 4/2014 | Kawahara |
| 2014/0133314 A1 | 5/2014 | Mathews et al. |
| 2014/0140206 A1 | 5/2014 | Hendel et al. |
| 2014/0155043 A1 | 6/2014 | Gell et al. |
| 2014/0192646 A1 | 7/2014 | Mir et al. |
| 2014/0204742 A1 | 7/2014 | Pandit |
| 2014/0269274 A1 | 9/2014 | Banavalikar et al. |
| 2014/0269324 A1 | 9/2014 | Tietz et al. |
| 2014/0269711 A1 | 9/2014 | Ravid et al. |
| 2014/0286349 A1 | 9/2014 | Kitada |
| 2014/0289568 A1 | 9/2014 | Koyoma et al. |
| 2014/0310354 A1 | 10/2014 | Fountain et al. |
| 2015/0026309 A1 | 1/2015 | Radcliffe et al. |
| 2015/0026361 A1 | 1/2015 | Matthews et al. |
| 2015/0058857 A1 | 2/2015 | Sandstorm |
| 2015/0095568 A1 | 4/2015 | Lamb et al. |
| 2015/0103667 A1 | 4/2015 | Elias |
| 2015/0124611 A1 | 5/2015 | Attar et al. |
| 2015/0127797 A1 | 5/2015 | Attar et al. |
| 2015/0163146 A1* | 6/2015 | Zhang ............... H04L 45/125 370/238 |
| 2015/0180782 A1 | 6/2015 | Rimmer et al. |
| 2015/0180790 A1 | 6/2015 | Rimmer et al. |
| 2015/0200866 A1 | 7/2015 | Pope et al. |
| 2015/0371607 A1 | 12/2015 | Holland et al. |
| 2015/0381505 A1 | 12/2015 | Sundararaman et al. |
| 2016/0135076 A1 | 5/2016 | Grinshpun et al. |
| 2016/0173383 A1 | 6/2016 | Liu et al. |
| 2016/0191392 A1 | 6/2016 | Liu |
| 2016/0226951 A1 | 8/2016 | Talpey et al. |
| 2016/0294715 A1 | 10/2016 | Raindel et al. |
| 2016/0337257 A1 | 11/2016 | Yifrach et al. |
| 2017/0093699 A1* | 3/2017 | Crupnicoff ............ H04L 47/263 |
| 2017/0118108 A1 | 4/2017 | Avci et al. |
| 2017/0142020 A1 | 5/2017 | Sundararaman et al. |
| 2017/0180261 A1 | 6/2017 | Ma et al. |
| 2017/0187641 A1 | 6/2017 | Lundqvist et al. |
| 2017/0295112 A1 | 10/2017 | Cheng et al. |
| 2017/0373989 A1 | 12/2017 | Gafni et al. |
| 2018/0063030 A1 | 3/2018 | Mitulal et al. |
| 2018/0063038 A1 | 3/2018 | Ghanwani et al. |
| 2018/0091388 A1 | 3/2018 | Levy et al. |
| 2018/0115498 A1 | 4/2018 | Sundaram et al. |
| 2018/0205653 A1 | 7/2018 | Wang et al. |
| 2018/0241677 A1 | 8/2018 | Srebro et al. |
| 2018/0278550 A1 | 9/2018 | Rosen et al. |
| 2018/0302328 A1 | 10/2018 | Keith et al. |
| 2019/0042443 A1 | 2/2019 | Maciejewski et al. |
| 2019/0042513 A1 | 2/2019 | Fleming, Jr. et al. |
| 2019/0044874 A1 | 2/2019 | Zhang et al. |
| 2020/0177521 A1 | 6/2020 | Blumrich et al. |
| 2020/0280518 A1 | 9/2020 | Lee et al. |
| 2021/0006502 A1 | 1/2021 | Zhou et al. |
| 2021/0344600 A1 | 11/2021 | Urman et al. |
| 2021/0377074 A1 | 12/2021 | Yoshida et al. |
| 2022/0045972 A1 | 2/2022 | Aibester et al. |
| 2022/0231933 A1 | 7/2022 | Mannor et al. |
| 2022/0263776 A1 | 8/2022 | Mula et al. |

(56) References Cited

U.S. PATENT DOCUMENTS

| | | | |
|---|---|---|---|
| 2023/0068902 | A1 | 3/2023 | Seely et al. |
| 2023/0137826 | A1 | 5/2023 | Ajami et al. |

FOREIGN PATENT DOCUMENTS

| | | | | |
|---|---|---|---|---|
| EP | 1698976 | A1 | 9/2006 | |
| EP | 1720295 | A1 | 11/2006 | |
| EP | 2466476 | A1 | 6/2012 | |
| WO | 03024033 | A1 | 3/2003 | |
| WO | 2009107089 | A2 | 9/2009 | |
| WO | 2013136355 | A1 | 9/2013 | |
| WO | 2013180691 | A1 | 12/2013 | |
| WO | 2018044426 | A1 | 3/2018 | |
| WO | 2018106868 | A1 | 6/2018 | |
| WO | WO-2019029318 | A1 * | 2/2019 | .............. H04L 47/11 |

OTHER PUBLICATIONS

U.S. Appl. No. 17/516,731 Office Action dated Jun. 16, 2023.
U.S. Appl. No. 17/503,383 Office Action dated Jun. 8, 2023.
U.S. Appl. No. 17/503,383 Office Action dated Aug. 17, 2023.
CN Application # 2021108967450 Office Action dated Sep. 8, 2023.
U.S. Appl. No. 17/588,385 Office Action dated Oct. 5, 2023.
U.S. Appl. No. 17/516,731 Office Action dated Oct. 6, 2023.
U.S. Appl. No. 17/902,936 Office Action dated Oct. 25, 2023.
"Understanding CoS Priority Group and Queue Guaranteed Minimum Bandwidth," Traffic Management User Guide (QFX Series and EX4600 Switches), juniper.net, pp. 1-4, Feb. 1, 2021, as downloaded from https://www.juniper.net/documentation/us/en/software/junos/traffic-mgmt-qfx/topics/concept/cos-qfx-series-guaranteed-bandwidth-understanding.html.
"QoS Modular Qos Command—Line Interface Configuration Guide, Cisco IOS Xe Fuji 16.8x," Cisco, pp. 1-25, Apr. 20, 2018, as downloaded from https://www.cisco.com/c/en/us/td/docs/ios-XML/ios/qos_mqc/configuration/xe-16-8/qos-mqc-xe-16-8-book/qos-limits-wred.html.
Aibester et al., U.S. Appl. No. 17/503,383, filed Oct. 18, 2021.
Aibester et al., U.S. Appl. No. 17/516,731, filed Nov. 2, 2021.
Infiniband Architecture Release 1.2.1, vol. 1, General specifications, Chapter 7.9, pp. 212-216, Nov. 2007.
Raatikainen, P., "ATM Switches—Switching Technology S38. 3165", Switching Technology, L8-1, pp. 1-34, year 2006 (http://www.netlab.hut.fi/opetus/s383165).
Fahmy, S., "A Survey of ATM Switching Techniques", Department of Computer and Information Science, The Ohio State University, USA, pp. 1-22, Aug. 21, 1995 downloaded from http://www.cs.purdue.edu/homes/fahmy/cis788.08Q/atmswitch.html.
Minkenberg et al., "Multistage Interconnection Networks for Data Centers; Bidirectional Fat Tree Construction and Routing for IEEE 802.1au", IBM Research GmbH, Zurich, Switzerland, pp. 1-9, Jul. 2, 2007.
Bwalya et al., "Performance Evaluation of Buffer Size for Access Networks in First Generation Optical Networks", International Journal of Internet of Things, vol. 6, issue 3, pp. 98-105, year 2017.
Ramakrishnan et al., "The Addition of Explicit Congestion Notification (ECN) to IP," Request for Comments (RFC) 3168, The Internet Society, pp. 1-63, Sep. 2001.
Spitulski, U.S. Appl. No. 17/840,371, filed Jun. 14, 2022.
Kadosh et al., U.S. Appl. No. 17/348,801, filed Jun. 16, 2021.
U.S. Appl. No. 17/175,716 Office Action dated Jun. 22, 2022.
Aibester et al., U.S. Appl. No. 17/588,385, filed Jan. 31, 2022.
Gran et al., "Congestion Management in Lossless Interconnection Networks", Submitted to the Faculty of Mathematics and Natural Sciences at the University of Oslo in partial fulfillment of the requirements for the degree Philosophiae Doctor, pp. 1-156, Sep. 2013.
Pfister et al., "Hot Spot Contention and Combining in Multistage Interconnect Networks", IEEE Transactions on Computers, vol. C-34, pp. 943-948, Oct. 1985.
Zhu et al.,"Congestion control for large-scale RDMA deployments", SIGCOMM, ACM, pp. 523-536, Aug. 17-21, 2015.
CISCO Systems, Inc., "Advantage Series White Paper Smart Buffering", pp. 1-16, year 2016.
Hoeiland-Joergensen et al., "The FlowQueue-CoDel Packet Scheduler and Active Queue Management Algorithm", Internet Engineering Task Force (IETF) as draft-ietf-aqm-fq codel-06, pp. 1-23, Mar. 18, 2016.
Hahne et al., "Dynamic Queue Length Thresholds for Multiple Loss Priorities", IEEE/ACM Transactions on Networking, vol. 10, No. 3, pp. 368-380, Jun. 2002.
Choudhury et al., "Dynamic Queue Length Thresholds for Shared-Memory Packet Switches", IEEE/ACM Transactions Networking, vol. 6, issue 2, pp. 130-140, Apr. 1998.
Huawei Technologies Co., Ltd., Baidu, Inc., "The Lossless Network for Data Centers," Revision 1.0, pp. 1-15, Nov. 7, 2017.
IEEE Standard 802.1Q™-2005, "IEEE Standard for Local and metropolitan area networks Virtual Bridged Local Area Networks", pp. 1-303, May 19, 2006.
Infiniband TM Architecture, Specification vol. 1, Release 1.2.1, Chapter 12, pp. 657-716, Nov. 2007.
IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.
IEEE Std 802.1Qbb., IEEE Standard for Local and metropolitan area networks—"Media Access Control (MAC) Bridges and Virtual Bridged Local Area Networks—Amendment 17: Priority-based Flow Control", pp. 1-40, Sep. 30, 2011.
CISCO Systems, Inc., "Priority Flow Control: Build Reliable Layer 2 Infrastructure", pp. 1-8 pages, year 2015.
Aibester et al., U.S. Appl. No. 17/955,591, filed Sep. 29, 2022.
Mula et al., U.S. Appl. No. 17/902,936, filed Sep. 5, 2022.
U.S. Appl. No. 17/503,383 Office Action dated Nov. 4, 2022.

* cited by examiner

FLOW-BASED CONGESTION CONTROL

TECHNICAL FIELD

Embodiments described herein relate generally to communication networks, and particularly to methods and systems for performing flow-based congestion control.

BACKGROUND

Congestion management of packet traffic in communication systems is important for achieving high system performance such as throughput and latency. Moreover, persistent congestion may cause severe performance degradation, e.g., due to congestion spread.

Various techniques for detecting and controlling congestion are known in the art. For example, Ramakrishnan et al. describe congestion control techniques that use Explicit Congestion Notification (ECN), in a Request for Comments (RFC) 3168 of the Internet Engineering Task Force (IETF), entitled "The Addition of Explicit Congestion Notification (ECN) to IP," September, 2001.

Switches used in high-speed networks such as Ethernet and InfiniBand, typically store incoming packets in a buffer memory until transmitted back to the network. Aspects of flexible usage of buffer space are described, for example, in U.S. Pat. No. 10,250,530 of Aibester et al., describing a communication apparatus that includes multiple interfaces configured to be connected to a packet data network for receiving and forwarding of data packets of multiple types. A memory is coupled to the interfaces and configured as a buffer to contain packets received through the ingress interfaces while awaiting transmission to the network via the egress interfaces. Packet processing logic is configured to maintain multiple transmit queues, which are associated with respective ones of the egress interfaces, and to place both first and second queue entries, corresponding to first and second data packets of the first and second types, respectively, in a common transmit queue for transmission through a given egress interface, while allocating respective spaces in the buffer to store the first and second data packets against separate, first and second buffer allocations, which are respectively assigned to the first and second types of the data packets.

SUMMARY

An embodiment that is described herein provides a network device that includes multiple ports, a Shared Buffer (SB) and a SB controller. The ports to connect to a communication network. The SB to temporarily store packets received from the communication network via the ports, the packets belonging to multiple flows. The SB controller to allocate one or more flow-specific storage regions in the SB, a given flow-specific storage region being allocated to store the packets that (i) belong to respective one or more of the flows and (ii) are to be transmitted via a respective egress queue. In response to detecting that an occupancy level in the given flow-specific storage region exceeds a specified occupancy threshold, the SB controller to report the flows in the given flow-specific storage region as congested.

In some embodiments, the SB controller is to allocate a defined number of storage regions to a given egress queue, evaluate a number of distinct flows that are actually transmitted from the storage regions via the given egress port, calculate a load level for a certain storage region among the storage regions allocated to the given egress queue, based on an occupancy level in the certain storage region and on the number of distinct flows, and in response to detecting that the load level of the certain storage region exceeds a specified load threshold, to report the flows in the certain storage region as congested. In other embodiments, the SB is to distribute the flows among the defined number of the storage regions by applying a specified hash function to headers of the packets belonging to the flows. In yet other embodiments, the SB controller is to report the flows in the certain storage region as congested, by reporting (i) the load level calculated for the certain storage region and (ii) identifiers of the flows in the certain storage region.

In an embodiment, the SB controller is to report the flows in the given flow-specific storage region as congested, by sending one or more congestion notifications to respective destination nodes to which the packets in the given flow-specific storage region are addressed. In another embodiment, the SB controller is to mirror a congestion notification among the one or more congestion notifications to a remote analyzer node coupled to the communication network. In yet another embodiment, the SB controller is to report the flows in the given flow-specific storage region as congested, to respective source nodes from which the one or more flows originate.

In some embodiments, the SB controller is to report multiple flows among the flows in the given flow-specific storage region that are destined to a common destination node, by including respective identifiers of the multiple flows in a packet, and sending the packet to respective destination addresses of the flows or to respective source addresses of the flows.

There is additionally provided, in accordance with an embodiment that is described herein, a method, including, in a network device that connects to a communication network using multiple ports, temporarily storing packets received from the communication network via the ports in a Shared Buffer (SB) of the network device, the packets belonging to multiple flows. One or more flow-specific storage regions are allocated in the SB, a given flow-specific storage region being allocated to store the packets that (i) belong to respective one or more of the flows and (ii) are to be transmitted via a respective egress queue. In response to detecting that an occupancy level in the given flow-specific storage region exceeds a specified occupancy threshold, the flows in the given flow-specific storage region are reported as congested.

These and other embodiments will be more fully understood from the following detailed description of the embodiments thereof, taken together with the drawings in which:

DETAILED DESCRIPTION OF EMBODIMENTS

Overview

Figure 1:
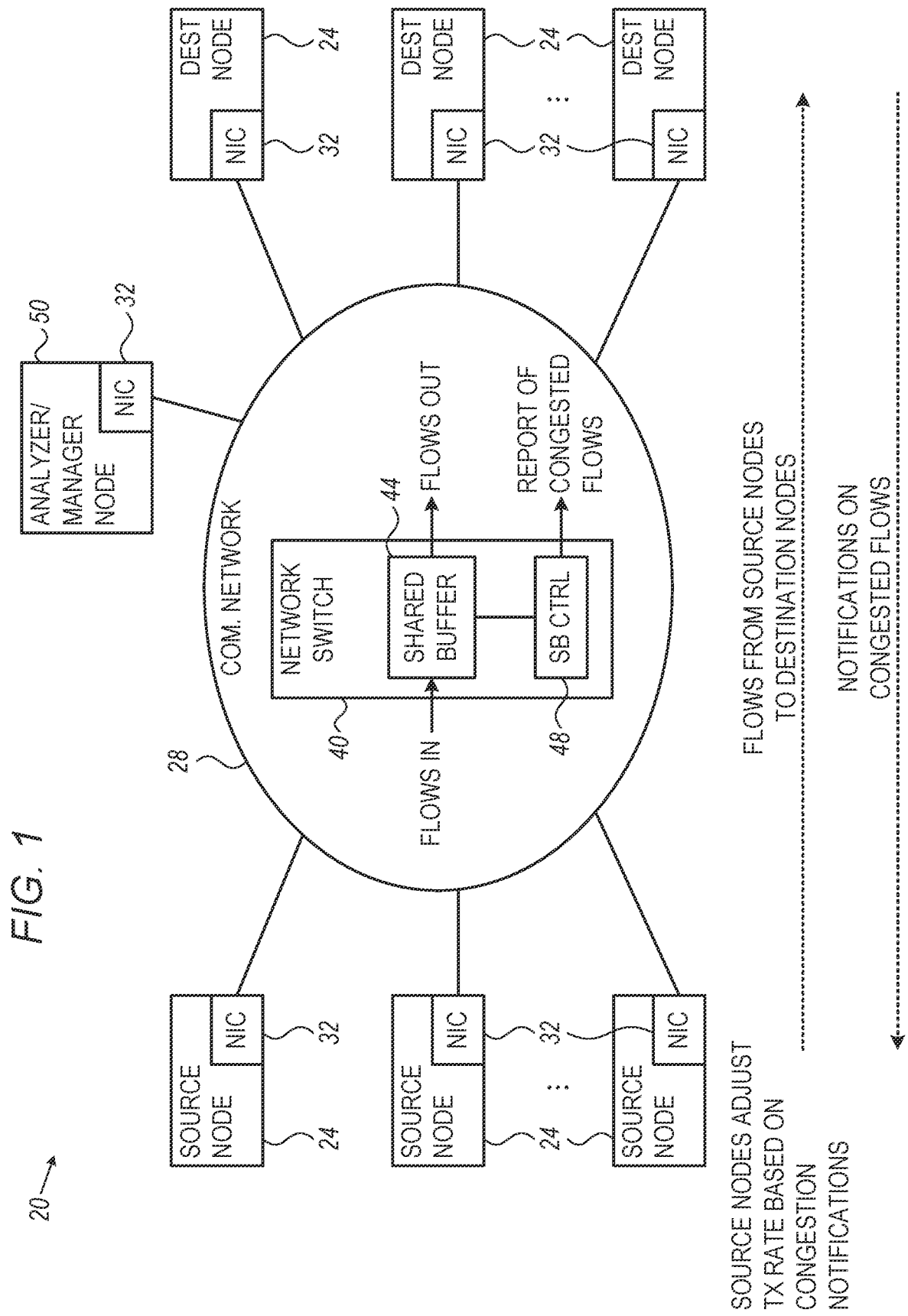
FIG. 1 is a block diagram that schematically illustrates a computer system in which network devices perform flow-based congestion control, in accordance with an embodiment that is described herein.

Embodiments that are described herein provide methods and systems for flow-based congestion control. In accordance with the disclosed embodiments, the detection of congested flows depends on occupancy levels in storage regions allocated to flows in a Shared Buffer (SB). Each storage region is mapped to one or more specific flows.

Various communication networks are built from multiple interconnected network devices such as routers or switches. A network device receives packets via multiple ports and stores the packets in a local buffer memory until transmitting them back to the network. In a shared buffer configuration, the storage space of the local buffer is shared among multiple physical ports of the switch. The storage space of the SB is typically handled by a SB controller within the switch.

The packets stored in the SB typically undergo various processing, including creating packet descriptors that are queued in Egress Queues (EQs) coupled to egress ports. In the disclosed embodiments, the SB controller allocates storage regions for (and based on) flows traversing the switch. Moreover, the SB controller maintains fairness in sharing SB resources among the flows. A storage region storing flows for which packets are not allowed to be dropped, may become overfilled, which indicates that at least some of the flows in that storage region are transmitted from their sources at high rates and may cause congestion in the switch. When the storage region is assigned to flows for which packets may dropped, the SB controller may drop packets in order to control overfilling.

The description that follows a network device refers mainly to network switch. The disclosed embodiments are similarly applicable, however, to other types of network devices that forward packets in a packet network such as routers.

Consider an embodiment of a network device (e.g., a switch) that includes multiple ports, a Shared Buffer (SB) and a SB controller. The ports connect to a communication network. The SB temporarily stores packets received from the communication network via the ports, the packets belonging to multiple flows. The SB controller allocates one or more flow-specific storage regions in the SB, wherein a given flow-specific storage region being allocated to store the packets that (i) belong to respective one or more of the flows and (ii) are to be transmitted via a respective egress queue. In response to detecting that an occupancy level in the given flow-specific storage region exceeds a specified occupancy threshold, the SB controller reports the flows in the given flow-specific storage region as congested. The SB controller may identify that the flows in the storage region are congested based on other and/or additional parameters such as, a load percentage in the storage region, a latency incurred by the switch in forwarding the flows in the storage region, and the like.

Each of the storage regions stores packets belonging to one or more flows. When the number of concurrent flows is relatively small, the SB controller may allocate storage regions as required. In this scheme, flows are mapped uniquely to storage regions based on flow identifiers carried in headers of the packets.

When the number of concurrent flows is very large, however, the SB may not have sufficient resources for managing as many storage regions, and the SB limits the number of storage regions allocated per EQ to a defined number. In this scheme, the SB controller calculates a load level for a certain storage region among the storage regions allocated to a given EQ, based on an occupancy level in the certain storage region and on a number of distinct flows actually transmitted from the certain storage region via the given EQ. In response to detecting that the load level of the certain storage region exceeds a specified load threshold, the SB controller reports the flows in the certain storage region as congested.

In embodiments in which the SB configuration supports a limited number of storage regions per EQ, the SB stores the received packets by distributing the flows to which they belong among the defined number of the storage regions. For example, the SB applies a specified hash function to headers of the packets, e.g., to a flow identifier in the headers. Assuming a number M of storage regions per EQ, the hash function has M possible outcomes, respectively associated with the M storage regions.

The SB controller may report flows as congested in various ways.

In some embodiments, the SB controller reports the flows in the given flow-specific storage region as congested, by sending one or more congestion notifications to respective destination nodes to which the packets in the given flow-specific storage region are addressed. The congestion notifications may be sent in-band, i.e., carried in headers of packets belonging to the flows (e.g., using ECN marking), or using dedicated packets. In an embodiment, the SB controller mirrors a congestion notification among the one or more congestion notifications to a remote analyzer node coupled to the communication network.

In some embodiments, for fast reaction to congestion, the SB controller reports the flows in the given flow-specific storage region as congested, directly to respective source nodes from which the one or more flows originate.

In some embodiments, the SB controller reports flows as congested by reporting each flow using a separate congestion notification. In alternative embodiments, the SB controller reports multiple flows among the flows in the given flow-specific storage region that are destined to a common destination node, by including respective identifiers of the multiple flows in a packet and sending the packet to respective destination addresses of the flows or to respective source addresses of the flows.

In embodiments in which the number of storage regions per EQ is limited, the SB controller may report the flows in a storage region as congested by reporting (i) the load level calculated for that storage region, and (ii) identifiers of the flows in the certain storage region (which are collectively indicative of the number of flows in the storage region.

In the disclosed techniques, a SB controller allocates storage regions in a shared buffer, to flows associated with a common egress queue. Based on occupancy levels in the storage regions, the SB controller may identify a congested storage region and report the flows in that storage region as congested. In other words, the SB reports any flow traversing this storage region as a flow that has passed through a congested storage region. A destination node reported of a congested flow, can send a suitable notification to the source node from which the flow originates, indicating the source node to reduce transmission rate of this flow. For example, the destination node may send to the source node a "PAUSE" message to stop transmission.

Using the disclosed techniques allows source nodes to quickly react to reported congested flows with reducing transmission rate into the network so as to prevent or resolve congestion events. Since the disclosed techniques result in reducing transmission rates of relevant flows that are likely to cause congestion, high throughput, low latency, and high network utilization are achieved concurrently.

System Description

FIG. 1 is a block diagram that schematically illustrates a computer system 20, in which network devices perform flow-based congestion control, in accordance with an embodiment that is described herein.

Computer system 20 comprises multiple network nodes 24 communicating with one another over a communication network 28. The network nodes connect to the communication network using any suitable network interface such a Network Interface Controller (NIC) 32.

Communication network 28 may comprise any suitable type of a communication network, operating using any suitable communication protocols. For example, communication network 28 may comprise an Ethernet network in which packets are communicated using the Transmission Control Protocol (TCP) and the Internet Protocol (IP). As another example, communication network 28 may comprise an InfiniBand™ fabric. Communication over network 28 may be based, for example, on the Remote Direct Memory Access (RDMA) over Converged Ethernet (RoCE) protocol, which is a RDMA protocol (implementing an InfiniBand transport layer) over IP and Ethernet. As another example, communication over network 28 may be based on the NVLink® protocol by Nvidia.

Computer system 20 may be used, for example, in high-rate communication applications such as, for example, in High-Performance Computing (HPC) environments, data centers, storage networks, Artificial Intelligence (AI) clusters, and in providing cloud services.

Communication network 28 comprises multiple interconnected network devices 40 such as switches or routers. For the sake of clarity, FIG. 1 depicts only one network device comprising a switch. Switch 40 comprises a SB 44 managed by a SB controller 48. Other switches in communication network 28 (not shown) may also comprise a SB and a SB controller.

In the example of FIG. 1, network nodes 24 depicted on the left side of the figure serve as source nodes sending packets to destination nodes depicted on the right side. In the present context, the term "flow" refers to a sequence of packets sent from a source node to a destination node. Each source node may send over communication network 28 one or more flows, and each destination node may receive from the communication network one or more flows.

In some applications, computer system 20 may be required to communicate many flows concurrently, some of which may carry high data rate traffic. In such a scenario, switch 40 may be overwhelmed by the amount of incoming traffic and become congested. The overall number of concurrent flows may range, for example, between a thousand and several million flows. Typically, each flow is associated with an application program running, e.g., on a host. The application program may communicate with other application programs in the same host or in other hosts. An application program may also serve as a distributed application program that is distributed across many hosts communicating with one another.

In the present context, "congested storage regions" are identified based on their respective occupancy levels. Moreover, a flow in a congested storage region is considered as a "congested flow." It is noted that a congested flow is likely to cause congestion and therefore its transmission rate at the source node should be reduced.

In some embodiments, switch 40 manages congestion detection using SB controller 48. The SB controller allocates storage regions to incoming flows and monitors the occupancy levels in these storage regions for detecting congested storage regions. The SB reports flows in congested storage regions to their destination nodes, which in turn send congestion notifications indicative of the congested flows to the source nodes from which they originate. In response to the congested notifications, the source nodes reduce the transmission rates of the reported flows to resolve the congestion or preventing imminent congestion.

In some embodiments, computer system 20 comprises an analyzer/manager node 50 coupled to communication network 28. The analyzer/manager node uses for network configuration and analysis. The analyzer/manager receives information from switches 40 and displays the information and/or configures the switches based on the information. In some embodiments, the analyzer/manager runs an Artificial Intelligence (AI) process as a background process, so as to analyze the behavior of application programs, and configure these application programs as required. The AI process may represent, for example, what metrics are more important than others. In an embodiment, switch 40 reports congested flows to the analyzer/manager, e.g., using mirroring techniques. The analyzer/manager may notify relevant source nodes to reduce transmission rate, based on the congested flows reported by switches 40.

Switch Architecture Supporting Flow-Based Congestion Control

Figure 2:
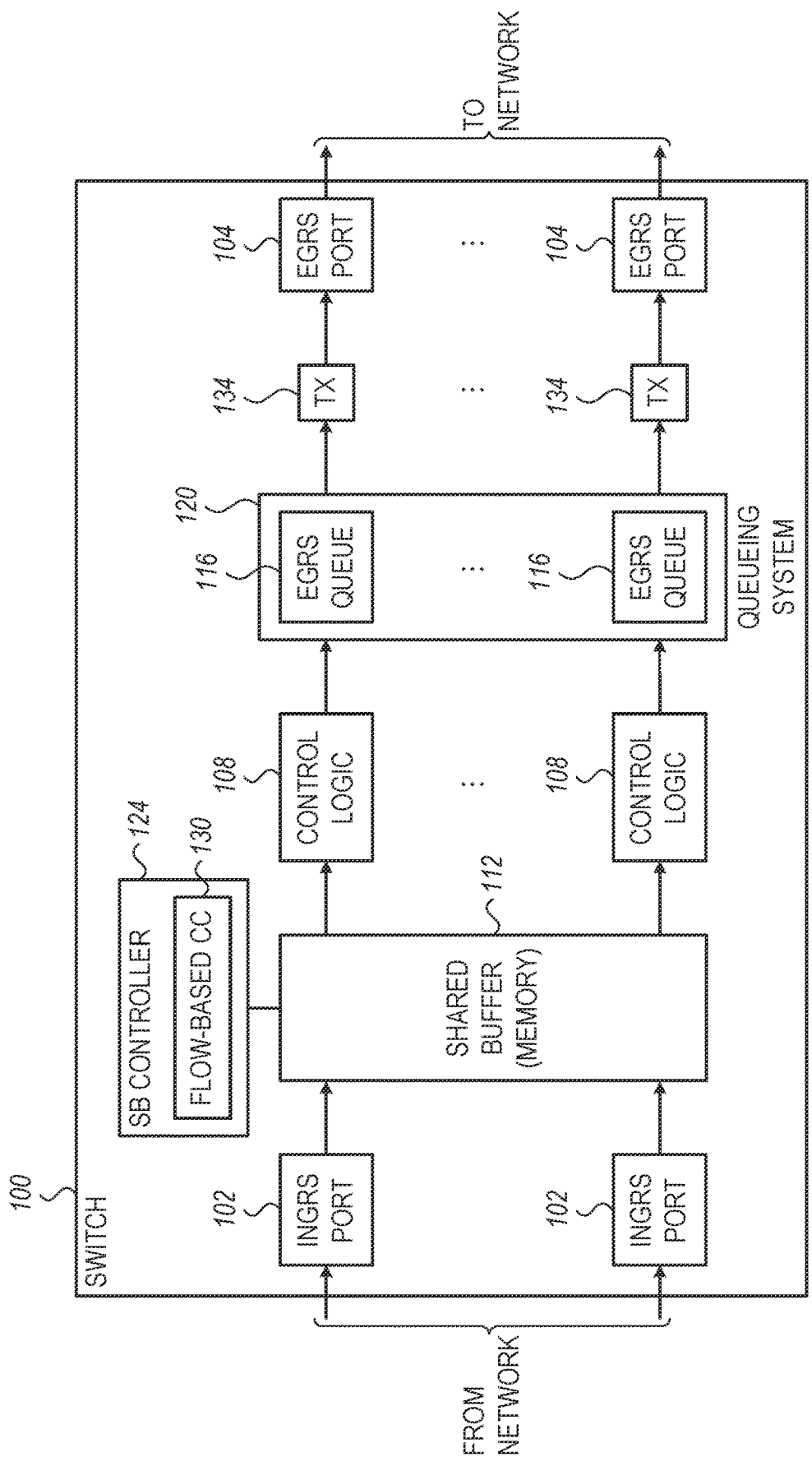
FIG. 2 is a block diagram that schematically illustrates a switch handling flow-based congestion control using a shared buffer, in accordance with an embodiment that is described herein.

FIG. 2 is a block diagram that schematically illustrates a switch 100 handling flow-based congestion control using a shared buffer, in accordance with an embodiment that is described herein.

Switch 100 may be used, for example, in implementing switch 40 of FIG. 1.

Switch 100 comprises interfaces in the form of ingress ports 102 and egress ports 104 for connecting to communication network 28. Switch 100 receives packets from the communication network via ingress ports 102 and transmits forwarded packets via egress ports 104. Although in FIG. 2, the ingress ports and egress ports are separated, in practice, each port may serve both as an ingress port and as an egress port.

Each ingress port 102 is associated with respective control logic 108 that processes incoming packets as will be described below. Although FIG. 2 depicts only two control logic modules 108, a practical switch may comprise hundreds ingress ports and corresponding control logic modules. A memory 112, coupled to ingress ports 102, is configured as a shared buffer for temporarily storing packets that are processed and assigned to multiple egress queues (described below) for transmission to the communication network.

In some embodiments, upon receiving an incoming packet via an ingress port 102, the ingress port places the packet in shared buffer 112 and notifies relevant control logic 108 that the packet is ready for processing. Control logic 108 applies to the packet various processing such as parsing the packet header(s) and generating for the packet a descriptor. Based on the descriptor, the control logic typically determines an egress port 104 through which the packet is to be transmitted. The descriptor may also indicate the quality of service (QoS) to be applied to the packet, i.e., the level of priority at reception and for transmission, and any applicable instructions for modification of the packet header. The control logic may also decide on whether to drop or admit the packet.

Control logic 108 places the descriptors of admitted packets in the appropriate Egress Queues (EQs) 116 in a queueing system 120, to await transmission via the designated egress ports 104. Typically, queuing system 120 contains a dedicated EQ for each egress port 104 or multiple EQs per egress port, one for each QoS level (e.g., transmission priority).

Control logic 108 passes the descriptors of admitted packets to queueing system 120 and to a shared buffer (SB) controller 124, which serves as the central buffer management and accounting module for shared buffer 112. SB controller 124 receives consumption information in response to control logic 108 deciding to admit a packet and receives release information in response to transmitting a queued packet. SB controller 124 allocates storage regions for incoming flows and maps the flows to the storage regions in the control plane. While the switch communicating flows, the SB controller monitors occupancy levels in storage regions based on the consumption and release information. In some embodiments, SB controller 124 comprises a flow-based Congestion Control (CC) module 130, which based on the monitored storage regions detects congested storage regions containing congested flows. Methods for detecting and reporting congested storage regions (that contain congested flows) will be described in detail below.

When a descriptor of a packet queued in queueing system 120 reaches the head of its queue, the queuing system passes the descriptor to a packet transmitter 134 coupled to a respective egress port 104, for execution. In response to the descriptor, packet transmitter 134 reads the packet data from shared buffer 112, and (optionally) makes whatever changes are called for in the packet header for transmission to communication network 28 through egress port 104.

The computer system configuration of FIG. 1 and the switch configuration of FIG. 2 are given by way of example, and other suitable computer system and switch configurations can also be used.

Some elements of switch 100, such as control logic 108 and SB controller 124 may be implemented in hardware, e.g., in one or more Application-Specific Integrated Circuits (ASICs) or Field-Programmable Gate Arrays (FPGAs). Additionally or alternatively, some elements of the switch can be implemented using software, or using a combination of hardware and software elements.

Elements that are not necessary for understanding the principles of the present application, such as various interfaces, addressing circuits, timing and sequencing circuits and debugging circuits, have been omitted from FIG. 2 for clarity.

Memory 112 implementing the SB may comprise any suitable storage device using any suitable storage technology, such as, for example, a Random Access Memory (RAM).

In some embodiments, some of the functions of SB controller 124 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Shared Buffer Congestion Control Schemes

Figure 3A:
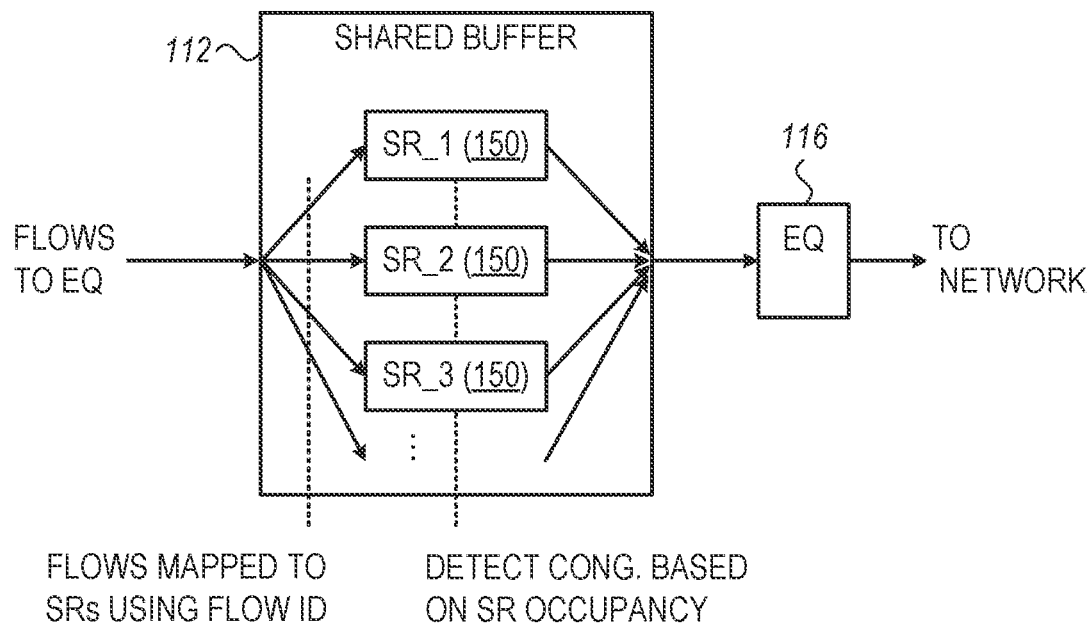
FIGS. 3A and 3B are diagrams that schematically illustrate example flow-based congestion control schemes, in accordance with embodiments that are described herein.
Figure 3B:
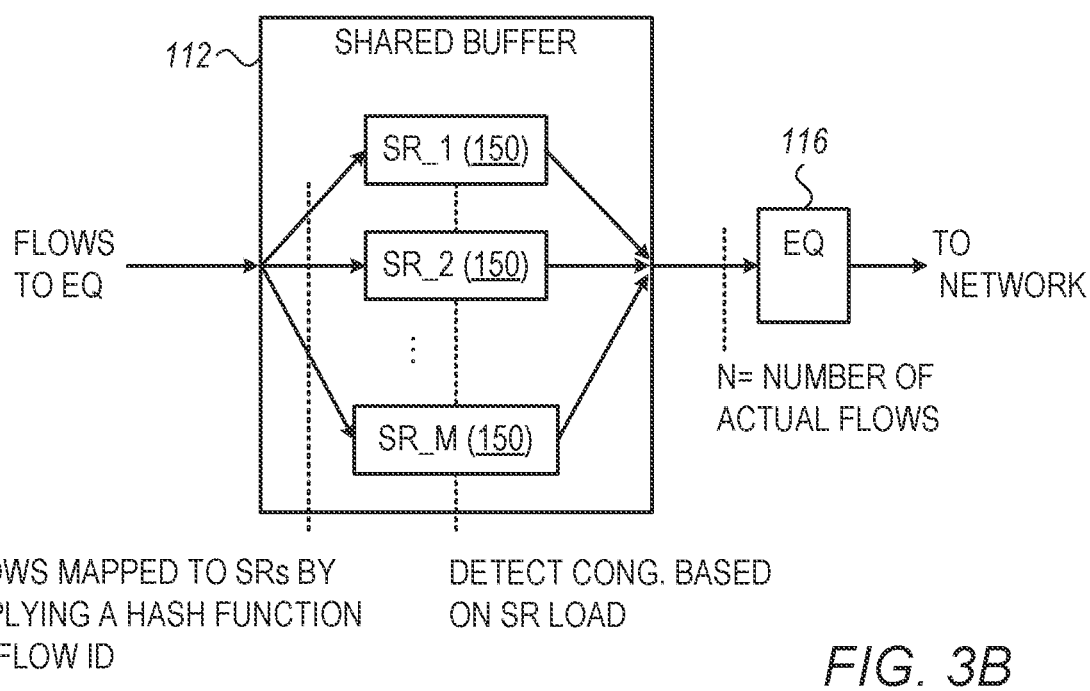

FIGS. 3A and 3B are diagrams that schematically illustrate example flow-based congestion control schemes, in accordance with embodiments that are described herein.

In managing congestion control, SB controller 124 allocates Storage Regions (SRs) 150 within SB 112. Each of the allocated SRs may stores packets (or payload data of the packets) belonging to one or more flows. The SB controller allocates separate respective groups of one or more SRs to flows that are forwarded to different EQs. In some embodiments, the SB controller maintains fairness among all active groups. Each of the groups aggregates several SRs and is mapped to a storage pool. FIGS. 3A and 3B depict one group of SRs 150 allocated to flows that are destined to a common EQ 116.

In describing storage region allocation, consider a source node establishing a connection with a destination node for sending a given flow from the source node to the destination node over communication network 28. It is further assumed that the packets of given flow traverse a switch in the network such as switch 100 of FIG. 2.

In some embodiments, in response to establishing the connection, SB controller 124 associates the given flow with one of the SRs 150 already allocated in SB 112 or allocates for the given flow a new SR in SB 112. The new SR typically belongs to some storage pool. When the connection of the given flow terminates and no other flows are associated with the SR of the given flow, the SB controller releases the storage space of this SR back to the storage pool.

In some embodiments, the SRs allocated by SB controller 124 to flows destined to a given EQ occupy the same storage space (a common SR size). In other embodiments, the SB controller allocates SRs of different sizes to at least two flows destined to the given EQ. In some embodiments, the SR size is determined depending on flow priority. In such embodiments, the SB controller may allocate to a high priority SR a larger storage space, compared to a low priority SR.

In the embodiment of FIG. 3A, the SB controller allocates SRs as required. In this case, flows are stored in the SB by mapping the flows to SRs using flow identifiers. A flow identifier may comprise, for example, a five-tuple carried in the packet header, including source and destination addresses and ports, and a protocol. Flow-based CC 130 monitors the occupancy levels in the SRs and detects a congested SR when the occupancy level of the SR exceeds an occupancy threshold. Upon detecting that a given SR is congested, flow-based CC 130 reports the flows in the given SR as congested.

In the embodiment of FIG. 3B, the overall number of SRs per EQ is limited to a positive integer denoted 'M'. In this embodiment the SB controller allocates M SRs for each EQ. In this scheme, the SB stores incoming flows by applying a suitable hash function to the flow identifier. The hash function has M outcomes associated respectively with the M SRs. Flow-based CC 130 monitors load levels in the M SRs, and detects a congested SR when the load level of the SR exceeds a load threshold. Upon detecting that a given SR is congested, flow-based CC 130 reports the flows in the given SR as congested. To calculate the load level of a SR, the SR controller estimates (e.g., using flow-based CC 130) the number of flows (denoted 'N') that are actually transmitted from the M SRs to the EQ in question. The SR controller calculates the load level as: (occupancy level in SR) M/N. On average, the flows mapped to the M SRs have the same load level.

SB controller 124 may report congested flows in various ways. In some embodiments, the SB controller reports the flows in a given storage region as congested, by sending one or more congestion notifications to respective destination nodes to which the packets in the given storage region are addressed.

In one embodiment, the SB controller reports each of the congested flows separately, e.g., by sending an Explicit Congestion Notification (ECN) to the relevant destination node in a header of a packet belonging to the flow, e.g., in accordance with RFC 3168 cited above. In another embodiment, the SB controller reports multiple congested flows that are forwarded to the same destination node in a common congestion notification that the SB controller sends to that destination node.

In an embodiment, in reporting multiple flows as congested, the SB controller includes respective identifiers of the multiple flows in a packet and sends the packet to respective destination addresses of the flows or to respective source addresses of the flows.

In some embodiments, the SB controller reports the flows in a given SR as congested, to respective source nodes from which the one or more flows in the given SR originate. Such embodiments result in fast reaction to a congestion condition in the network.

In embodiments in which the number of SRs per EQ is limited to M as depicted in FIG. 3B, the SB controller may report the flows in a given SR as congested, by sending to the relevant destination nodes notifications indicative of (i) the load level of the given SR and (ii) identifiers of the flows in the given SR. The SB may send the notifications in band, i.e., within the packets of the flow, or using dedicated packets. A destination node receiving a notification of a load level, may decide to send a congestion notification to relevant source nodes.

Methods for Congestion Detection

Figure 4:
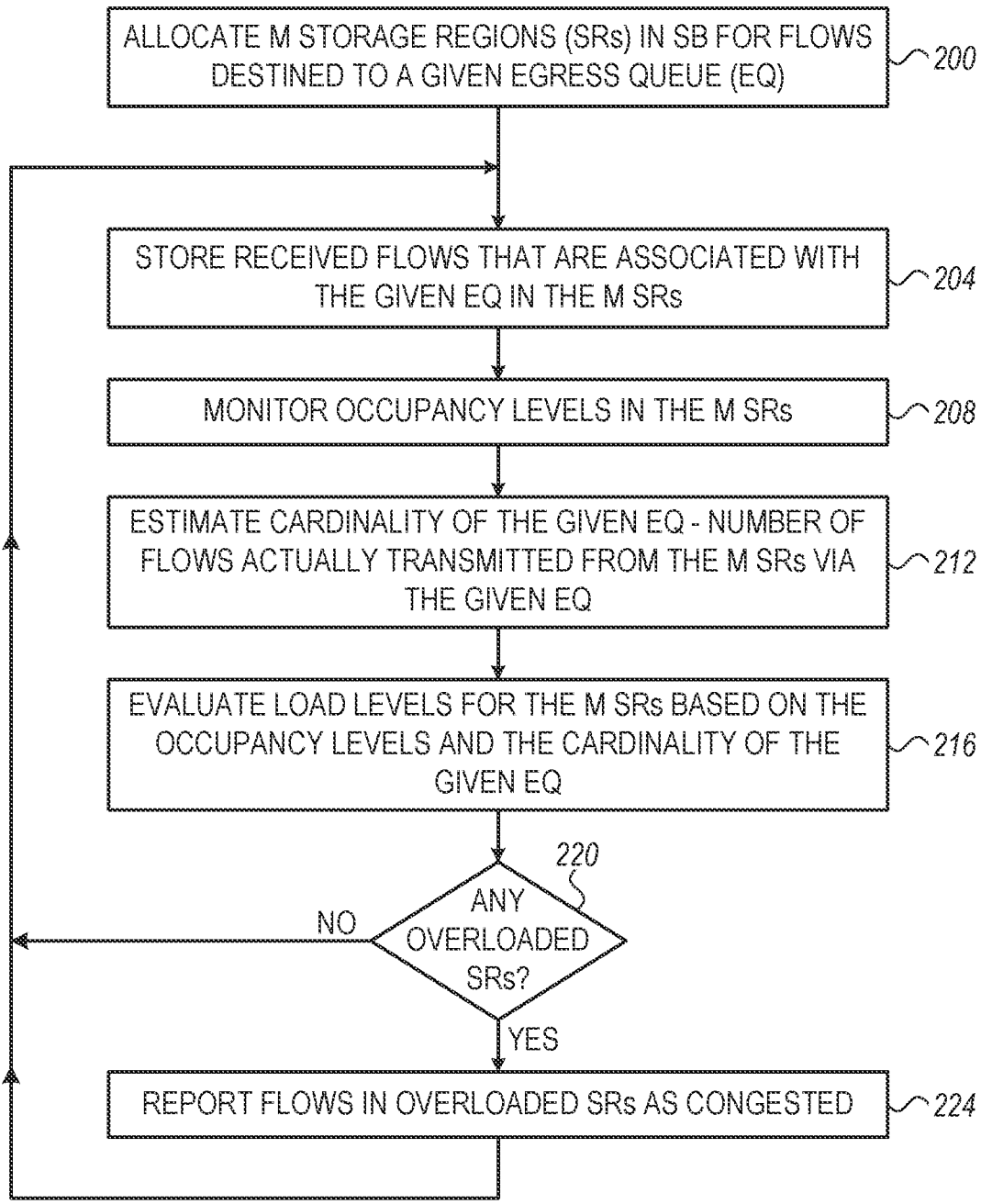
FIG. 4 is a flow chart that schematically illustrates a method for congestion detection based on storage regions allocated to flows in a shared buffer, in accordance with an embodiment that is described herein.

FIG. 4 is a flow chart that schematically illustrates a method for congestion detection based on storage regions allocated to flows in a shared buffer, in accordance with an embodiment that is described herein.

The method will be described as executed by various elements of switch 100 of FIG. 2.

The method begins at a storage allocation step 200, with SB controller 124 allocating M Storage Regions (SRs) in SB 112 for incoming flows that are destined to a given EQ 116. At a reception step 204, SB 112 receives incoming flows via ingress ports 102. SB 112 stores packets (or payload data of the packets) of those flows among the received flows that are destined to the given EQ, in the M SRs allocated for the given EQ. SB 112 maps the flows to respective SRs by applying a hash function to a flow identifier in the packet header, wherein the hash function has M different outcomes corresponding to M SRs.

At a monitoring step 208, flow-based CC 130 of the SB controller monitors the occupancy levels of the M SRs. At a cardinality estimation step 212, the flow-based CC estimates the cardinality of the given EQ, the cardinality being the number of flows actually transmitted from the M SRs via the given EQ. At a load evaluation step 216, the flow-based CC evaluates M load levels corresponding to the M SRs based on occupancy levels of the SRs and on the cardinality of the given EQ. Specifically, for the $i^{th}$ SR, $i=1 \ldots M$, having a respective occupancy level denoted OL (i), the flow-based CC calculates the load as given by:

$$\text{Load}[SR(i)] = OL(i) \cdot M/N. \qquad \text{Equation 1:}$$

At a congestion checking step 220, the flow-based CC checks whether any of the M SRs is overloaded, i.e., its load level exceeding a load threshold, and if so, the SB controller identifies such SR(s) as congested and reports the flows in such SR(s) as congested, at a congestion reporting step 224. When at step 220, no congested SR has been detected, or following step 224, the method loops back to step 204 to receive more flow traffic.

The embodiments described above are given by way of example, and alternative suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
   multiple ports, to connect to a communication network;
   a Shared Buffer (SB), to temporarily store packets received from the communication network via the ports, the packets belonging to multiple flows; and
   a SB controller, to:
   allocate one or more flow-specific storage regions in the SB, a given flow-specific storage region being allocated to store the packets that (i) belong to respective one or more of the flows and (ii) are to be transmitted via a respective egress queue;
   allocate a defined number of the storage regions to a given egress queue of the network device;
   evaluate a count of distinct flows that are actually transmitted from the storage regions via the given egress queue;
   calculate a load level for a certain storage region among the storage regions allocated to the given egress queue, based on an occupancy level in the certain storage region and on the count of distinct flows; and
   in response to detecting that the load level of the certain storage region exceeds a specified load threshold, report the flows in the certain storage region as congested.

2. The network device according to claim 1, wherein the SB is to distribute the flows among the defined number of the storage regions by applying a specified hash function to headers of the packets belonging to the flows.

3. The network device according to claim 1, wherein the SB controller is to report the flows in the certain storage region as congested, by reporting (i) the load level calculated for the certain storage region and (ii) identifiers of the flows in the certain storage region.

4. The network device according to claim 1, wherein the SB controller is to report the flows in the certain storage region as congested, by sending one or more congestion notifications to respective destination nodes to which the packets in the certain storage region are addressed.

5. The network device according to claim 4, wherein the SB controller is to mirror a congestion notification among the one or more congestion notifications to a remote analyzer node coupled to the communication network.

6. The network device according to claim 1, wherein the SB controller is to report the flows in the certain storage region as congested, to respective source nodes from which the flows originate.

7. The network device according to claim 1, wherein the SB controller is to report multiple flows among the flows in the certain storage region that are destined to a common destination node, by including respective identifiers of the multiple flows in a packet, and sending the packet to respective destination addresses of the flows or to respective source addresses of the flows.

8. The network device according to claim 1, wherein the load level is calculated as $$L_{SR}=OL_{SR} \cdot M_{EQ}/N_{EQ}$$

in which:
$L_{SR}$ denotes the load level for the certain storage region SR,
$OL_{SR}$ denotes the occupancy level of the certain storage region SR,
$M_{EQ}$ denotes the number of the storage regions allocated to the given egress queue EQ, and
$N_{EQ}$ denotes the count of distinct flows that are actually transmitted from the ME storage regions via the given egress queue EQ.

9. A method, comprising:
in a network device that connects to a communication network using multiple ports,
temporarily storing packets received from the communication network via the ports in a Shared Buffer (SB) of the network device, the packets belonging to multiple flows;
allocating one or more flow-specific storage regions in the SB, a given flow-specific storage region being allocated to store the packets that (i) belong to respective one or more of the flows and (ii) are to be transmitted via a respective egress queue;
allocating a defined number of the storage regions to a given egress queue of the network device;
evaluating a count of distinct flows that are actually transmitted from the storage regions via the given egress queue;
calculating a load level for a certain storage region among the storage regions allocated to the given egress queue, based on an occupancy level in the certain storage region and on the count of distinct flows; and
in response to detecting that the load level of the certain storage region exceeds a specified load threshold, reporting the flows in the certain storage region as congested.

10. The method according to claim 9, and comprising distributing the flows among the defined number of the storage regions by applying a specified hash function to headers of the packets belonging to the flows.

11. The method according to claim 9, wherein reporting the flows in the certain storage region as congested comprises reporting (i) the load level calculated for the certain storage region and (ii) identifiers of the flows in the certain storage region.

12. The method according to claim 9, wherein reporting the flows in the certain storage region as congested comprises sending one or more congestion notifications to respective destination nodes to which the packets in the certain storage region are addressed.

13. The method according to claim 12, and comprising mirroring a congestion notification among the one or more congestion notifications to a remote analyzer node coupled to the communication network.

14. The method according to claim 9, wherein reporting the flows in the certain storage region as congested comprises reporting the flows in the certain storage region as congested to respective source nodes from which the one or more flows originate.

15. The method according to claim 9, wherein reporting the flows in the certain storage region as congested comprises reporting multiple flows among the flows in the certain storage region that are destined to a common destination by node, including respective identifiers of the multiple flows in a packet, and sending the packet to respective destination addresses of the flows or to respective source addresses of the flows.

16. The method according to claim 9, wherein calculating the load level comprises calculating $$L_{SR}=OL_{SR} \cdot M_{EQ}/N_{EQ}$$

in which:
$L_{SR}$ denotes the load level for the certain storage region SR,
$OL_{SR}$ denotes the occupancy level of the certain storage region SR,
$M_{EQ}$ denotes the number of the storage regions allocated to the given egress queue EQ, and
$N_{EQ}$ denotes the count of distinct flows that are actually transmitted from the $M_{EQ}$ storage regions via the given egress queue EQ.

* * * * *